United States Patent [19]
Takeda et al.

[11] Patent Number: 4,503,507
[45] Date of Patent: Mar. 5, 1985

[54] ROBOT CONTROL DATA PROCESSING APPARATUS

[75] Inventors: Kenji Takeda, Kamakura; Yoshinao Arai, Yokohama, both of Japan

[73] Assignee: Hitachi, Ltd., Tokyo, Japan

[21] Appl. No.: 389,077

[22] Filed: Jun. 16, 1982

[30] Foreign Application Priority Data

Jun. 17, 1981 [JP] Japan .................................. 56-92287

[51] Int. Cl.³ ........................ G06F 15/46; G05B 19/42
[52] U.S. Cl. .................................... 364/513; 318/568; 364/131; 901/8
[58] Field of Search ............... 364/513, 474, 478, 468, 364/469, 191–193, 131–134; 318/568; 414/730; 219/79, 80, 125.1; 29/701; 901/6–8

[56] References Cited
U.S. PATENT DOCUMENTS

| 3,654,616 | 4/1972 | Dunne et al. | 364/513 X |
| 3,890,552 | 6/1975 | Devol et al. | 318/568 |
| 4,092,719 | 5/1978 | Salmon | 364/468 |
| 4,260,941 | 4/1981 | Engelberger et al. | 318/568 X |

Primary Examiner—Joseph F. Ruggiero
Attorney, Agent, or Firm—Antonelli, Terry & Wands

[57] ABSTRACT

A robot control data processing apparatus comprises a robot control data dividing processor for dividing robot control data adapted for monitoring and controlling robots into a plurality of operation elements and storing the robot control data in units each forming an operation element, and a robot control data editing processor for selectively combining and editing one or more of the plurality of the divisional operation elements. The robot control data is prepared by teaching the robots in operation and/or programming a robot oriented language.

5 Claims, 17 Drawing Figures

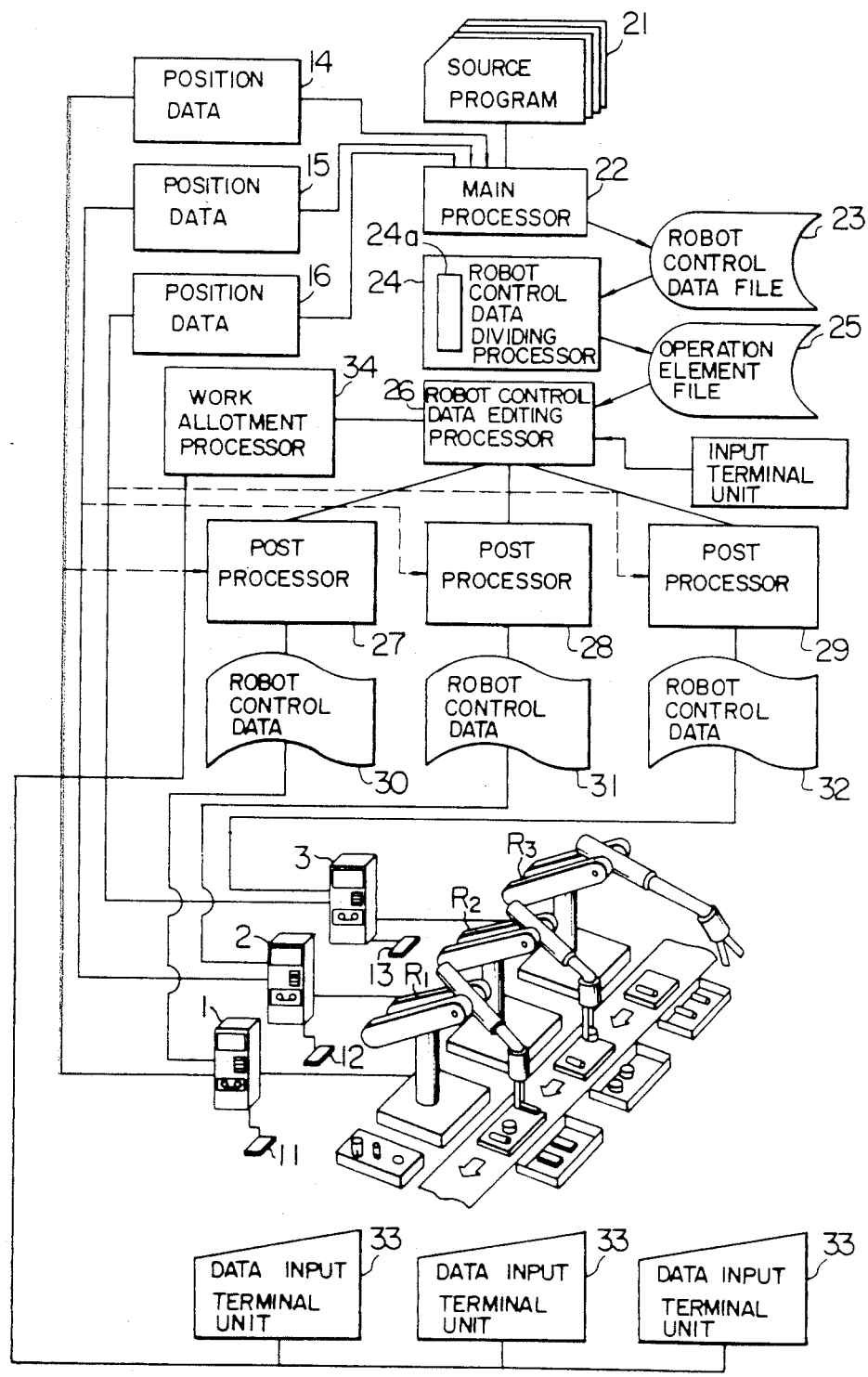

FIG. 13

```
┌─────────────────────┐
│  PROGRAM    123     │
│  SPEED       15     │
├─────────────────────┤
│  TOOL       080     │
│  OPEN               │
│  SPEED       20     │
│  MOVE POINT  41     │ ~204
│  CLOSE              │
│  MOVE POINT  42     │
│  OPEN               │
│  WAIT         1     │
│  CLOSE              │
│  MOVE POINT   0     │
├─────────────────────┤
│  TOOL       521     │
│  AUX-ON     120     │
│  OPEN               │
│  SPEED       10     │ ~205
│  MOVE POINT  51     │
│  MOVE POINT  52     │
│  MOVE POINT   0     │
├─────────────────────┤
│  TOOL       201     │
│  OPEN               │
│  MOVE POINT  61     │
│  CLOSE              │
│  MOVE POINT  62     │
│  OPEN               │ ~206
│  WAIT         1     │
│  AUX-OFF    120     │
│  CLOSE              │
│  MOVE POINT   0     │
│  STOP               │
├─────────────────────┤
│  FINISH             │
└─────────────────────┘
```

D0001-4 → 204
D0001-5 → 205
D0001-6 → 206

START CONDITION DATA
FOR D0001-4
| SPEED   | 15  |
| AUX-OFF | 120 |  ~214

END CONDITION DATA
FOR D0001-4
| SPEED   | 20  |
| AUX-OFF | 120 |  ~224

START CONDITION DATA
FOR D0001-5
| SPEED   | 20  |
| AUX-OFF | 120 |  ~215

END CONDITION DATA
FOR D0001-5
| SPEED   | 10  |
| AUX-ON  | 120 |  ~225

START CONDITION DATA
FOR D0001-6
| SPEED   | 10  |
| AUX-ON  | 120 |  ~216

END CONDITION DATA
FOR D0001-6
| SPEED   | 10  |
| AUX-OFF | 120 |  ~226

ROBOT CONTROL DATA PROCESSING APPARATUS

This invention relates to a robot control data processing apparatus which can prepare updated robot control data conformable to changes of the work field situation on the basis of robot control data for controlling the motion of robots.

In recent years, a great number of robots have been introduced into factories for automation therein. The robots contribute to improved productivity since they can perform more varieties of working operations than conventional uni-functional automated equipments by simply changing the robot control data. FIG. 1 is a perspective view illustrating a work field to which such robots are applied. For example, there are provided in the work field three robots $R_1$ to $R_3$, robot controllers 1 to 3 for controlling the respective robots, a conveyor 4, and parts supply stations 5 to 7.

The robot control data is prepared by making assumptive correspondence between each of the robots and the sequence of operations pursuant to scheduled operations to be performed by each of the robots. The individual robots $R_1$ to $R_3$ have ability to perform various kinds of operations and hence there are some alterable schedules for a robot used for assembling a product and a sequence of operations for the used robot. Considering changes of work field situation, such as alternation of the type of products (product mix), occurrence of products on urgent order and failure of robots, which leads to under or over work to be performed by the individual robots, it is desirable that work allotment to the individual robots be changed for highly efficient utilization of the work field. However, as far as a conventional robot control data preparation method is concerned, teaching or programming for robot control data needs to be renewed when the number of robots is increased for increasing the production output or the aforementioned changes of work field situation occur so that work allotment to the individual robots is necessarily changed. This renewal is time-consuming and troublesome, resulting in failure to make quick response to the changes of work field situation.

The present invention contemplates elimination of the conventional disadvantages and has for its object to provide a robot control data processing apparatus which is capable of effecting work allotment to robots in units of an operation element, that is, a simple motion combination used to describe the sensory-motor activity in an operation, and instantaneously editing necessary robot control data to thereby follow changes of the work field situation.

According to this invention, the robot control data processing apparatus comprises a robot control data dividing processor for dividing robot control data into units of the operation element, and a robot control data editing processor for combining and editing the operation elements in accordance with the current work field situation. Advantageously, robot control data can be prepared in such a manner that the sequence of operations to be shared by robots for assembling a product is not fixedly scheduled for the individual robots, thereby making it possible to instantaneously make a work allotment conformable to changes of work field situation and supply updated necessary robot control data with attainment of improved rate of robot operation and improved productivity.

The present invention will be apparent from the following detailed description taken in conjunction with the accompanying drawings, in which:

FIG. 2 is a block diagram of an automated assembling line to which a robot control data processing apparatus of this invention is applied;

Figure 6A:
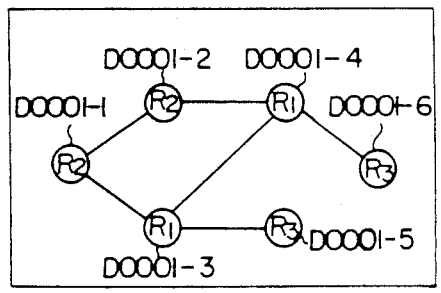
Figure 6B:
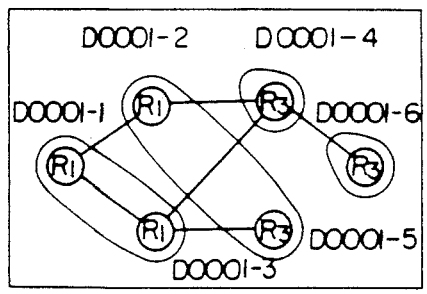
Figure 6C:
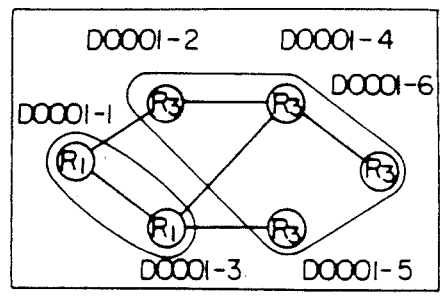
Figure 7:
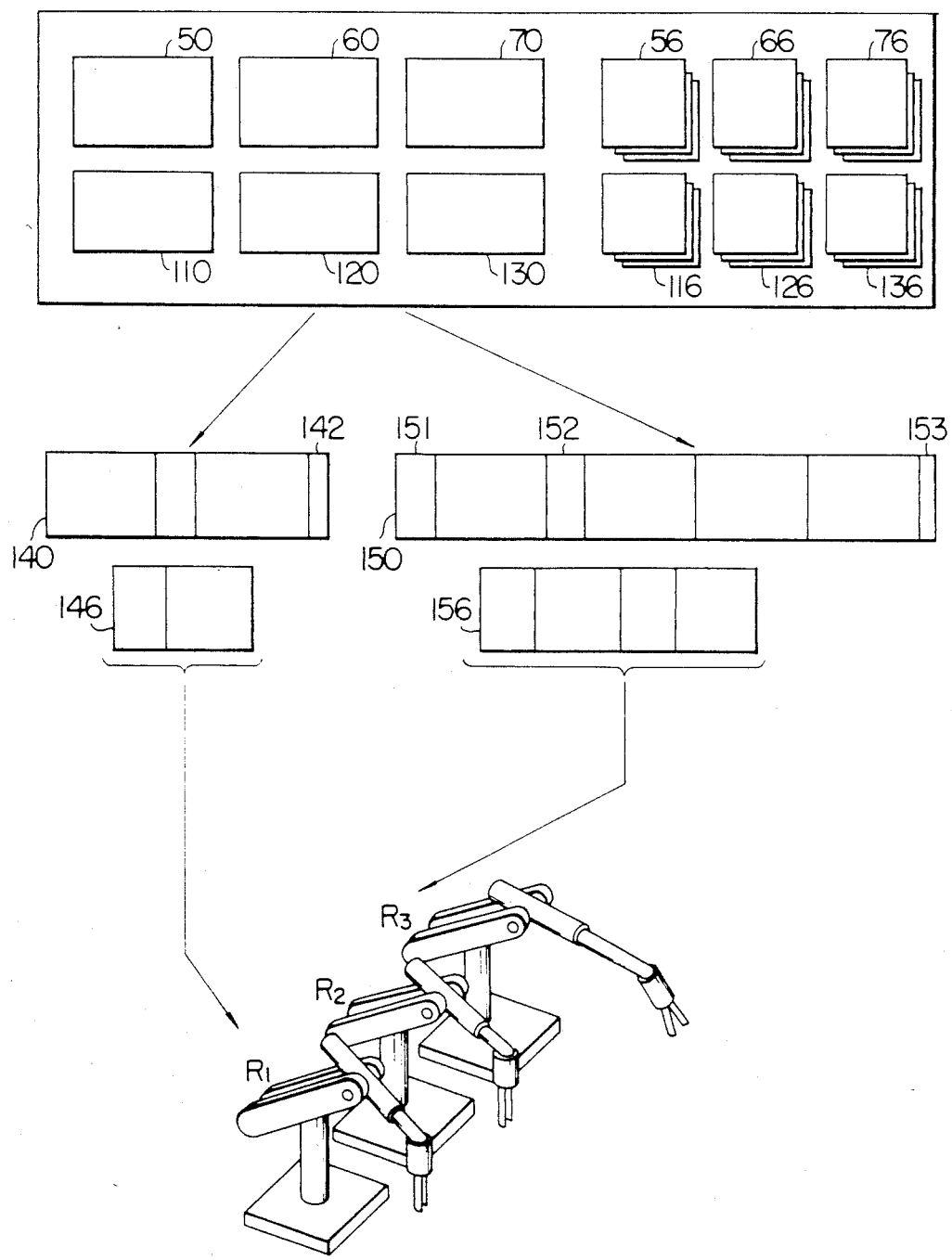
Figure 8:
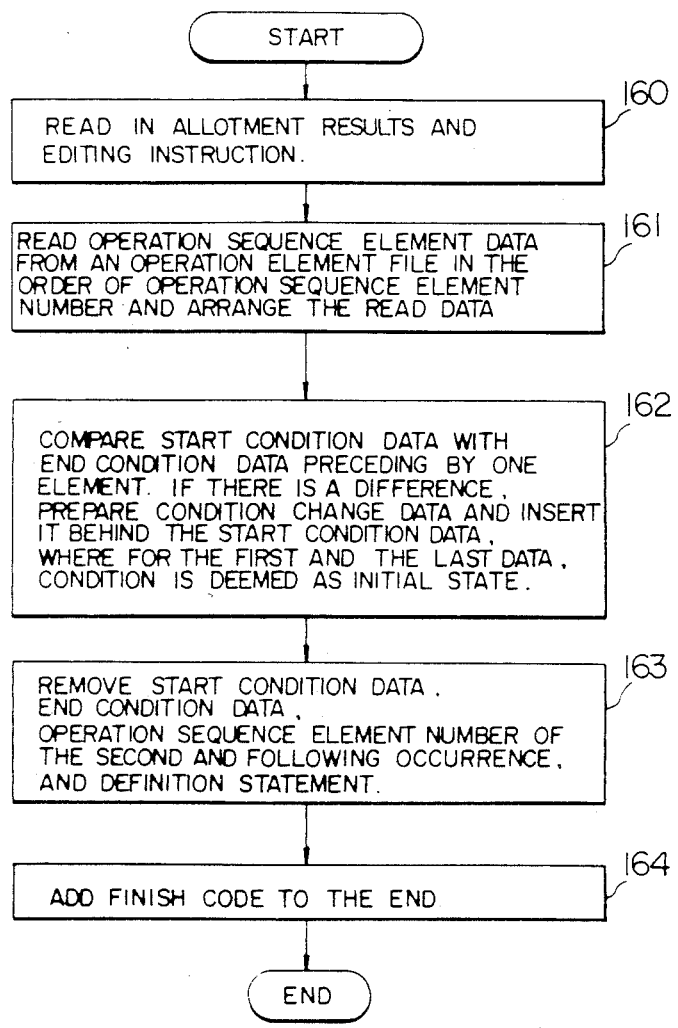
Figure 9:
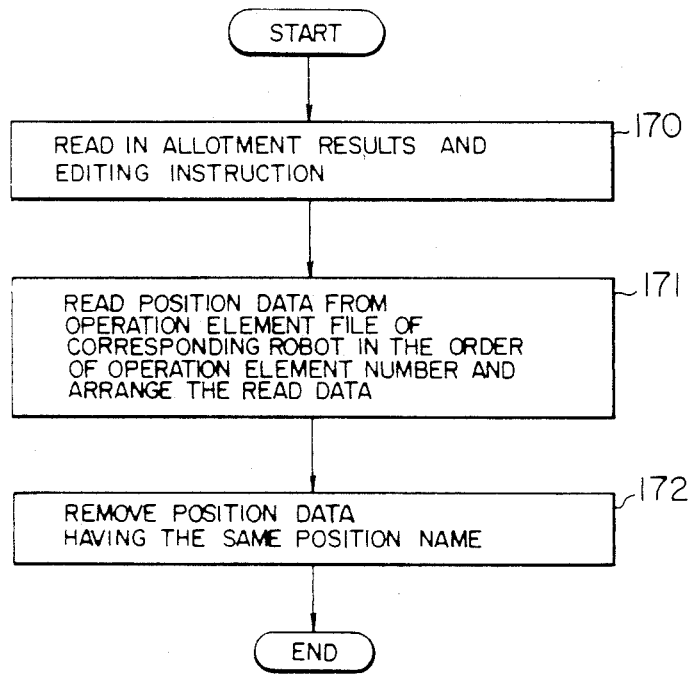
Figure 10:
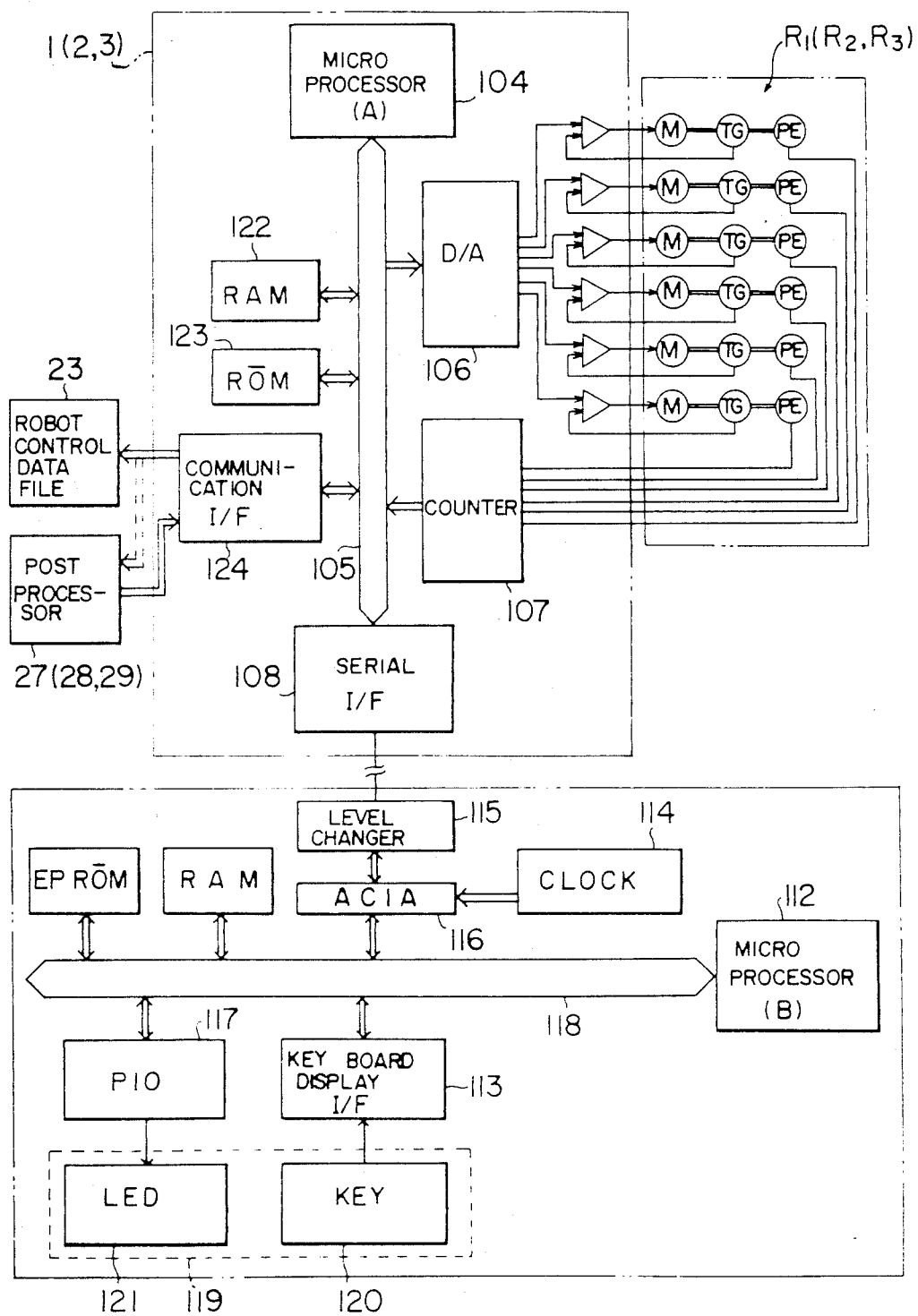
Figure 11:
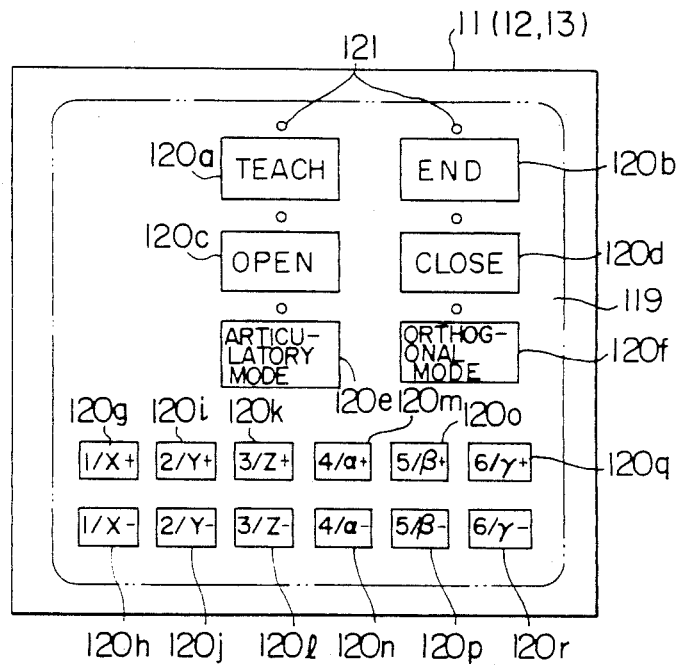
Figure 12:
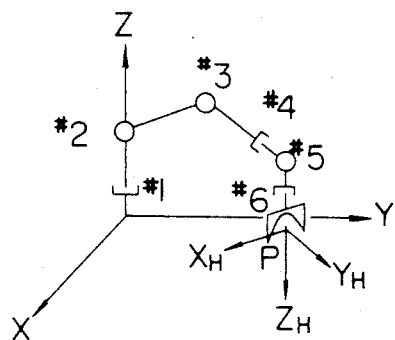
Figure 14:
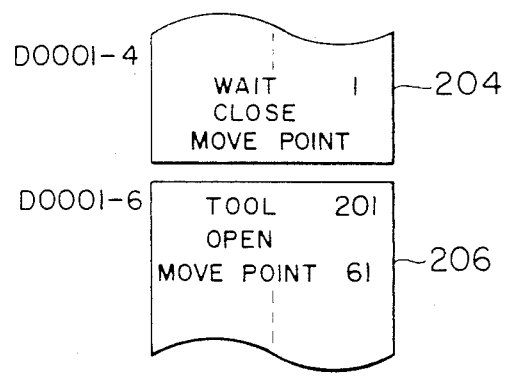
Figure 15:
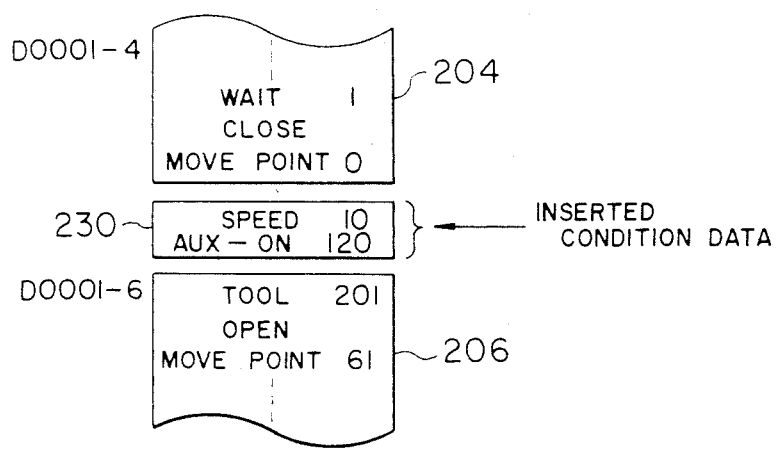

FIGS. 6A, 6B, and 6C illustrate various results of work allotment;

FIG. 7 illustrates data formats useful in explaining the operation of a robot control data editing processor used in the apparatus of FIG. 2;

FIGS. 8 and 9 are flow charts for explaining the operation of the data editing processor;

FIG. 10 is a block diagram showing a robot controller and a teaching box in accordance with the invention;

FIG. 11 is a plan view showing an external appearance of the teaching box;

FIG. 12 schematically illustrates, in an articulatory form, a robot;

FIG. 13 illustrates an example of dividing a program of operation sequence in robot language and start condition data and end condition data thereof;

FIG. 14 illustrates an example of wrong editing without considering start condition and end condition independent of this invention; and FIG. 15 illustrates the editing results in view of start condition and end condition according to this invention.

Prior to describing a robot control data processing apparatus embodying the invention, robot control data formulation and terminologies appearing in this specification will first be explained.

Typically, the data for controlling a robot, i.e. robot control data, consists of "operation sequence data" which establishes the sequence of operations of the robot and "position data" which establishes the positions at which the operations are performed. The operation sequence data is a series of instructions for instructing, for example, exchange of finger tools, movement to a position and release of finger tools. The position data is numerical data representative of positions at which the operations are performed.

The operation sequence data and position data are described in combination as robot control data or alternatively, they are described in independent forms and reference is made to the position data during execution of the operations. Of available methods for data preparation, a first method is such that the operation sequence data and position data are both inputted from a source program, a second method is such that only the operation sequence data is inputted from the source program whereas the position data is directly fetched at a position at which the robot is operating, and a third method is such that the operation sequence data and position data are inputted by manipulating push puttons on a teaching box attached to the robot.

In the following description, the robot control data preparation is based on the second method wherein the operation sequence data is inputted from the source program and the position data is directly fetched by operating robots through the use of teaching boxes associated therewith at positions at which the robots are operating. Also, the operation sequence data and position data are described in independent forms. However, the invention may be implemented based on the other methods for data preparation.

Now, definitions of terminologies appearing in the present specification will be explained.

(1) Operation element

A minimum work unit to be allotted to a robot. When assembling a product, a single type of finger tool works over a range defined by an operation element to assemble identical parts.

Operation sequence data corresponding to the operation element is called operation sequence element data. Position data corresponding to the operation element is called position element data.

(2) Work precedence relation

When there is an operation element to be executed prior to execution of another operation element, the relation between the former (preceding operation element) and the latter (following operation element) is defined as a work precedence relation. In wheel assembling work for automobiles, for example, mounting of a wheel to a wheel base stands for a preceding operation element relative to bolt tightening work.

(3) Work group

A set of sequential operation elements including operations to be shared by a single robot in accordance with loading, planning and rate of operation.

(4) Record

Robot control data, and information regarding finger operations and information for instructing various functions of a robot which are temporarily stored in a memory for preparation of the robot control data. A record is classified into the following definition sentence, operation data and condition data.

(5) Definition sentence

This defines the name of source program, used and the robot number and finger tool number to be used.

(6) Operation data

This data instructs an actual operation of a robot finger and contains data regarding movement direction, speed and stoppage of the finger.

(7) Condition data

This data instructs the operation conditions of the robot, such as operating speed, compensating system of operating track, operating order of each shaft and synchronism with other peripheral equipments such as parts supplier and conveyor.

Referring now to FIGS. 2 to 12, a preferred embodiment of the invention will be described.

FIG. 2 shows an overall construction of an assembling line comprised of robots $R_1$ to $R_3$ to which the present invention is applied. A source program 21 based on a robot oriented language prepared without assumptive operations for the individual robots is processed by a main processor 22 of an automatic programming device and stored, as operation sequence data representative of a series of operations of all the robots necessary for assembling a product, in a robot control data file 23.

For example, the robot languages are as follows:
PROGRAM: instructs the program number of the operation sequence.
FINISH: instructs the end of the program.
STOP: instructs the end of the operation.
TOOL: instructs the finger tool number which is used.
SPEED: instructs the operation speed.
MOVE: instructs the movement to the specified position.
OPEN: opens tool.
CLOSE: closes tool.
POINT: instructs the position data number corresponding to the position data of the moved position.
WAIT: instructs the stop of instructed hour and operation.
AUX-ON: turns on the synchronizing output to auxiliary machine.
AUX-OFF: turns off the synchronizing output to auxiliary machine.

Furthermore, position data 14, 15 and 16 taught by teaching boxes 11, 12 and 13 associated with the robots $R_1$, $R_2$ and $R_3$ are also stored in the robot control data file 23.

Incidentally, each of the robot controllers 1, 2 and 3 and each of the teaching boxes 11, 12 and 13 which are associated with the robots $R_1$, $R_2$ and $R_3$ as shown in FIG. 2 are detailed in FIG. 10. The teaching boxes 11, 12 and 13 each have an external appearance as shown in FIG. 11. When operation keys on the teaching box 11, 12 or 13 are depressed, data is fetched by a microprocessor (A) 104 of the controller 1, 2 or 3 through a serial I/F 108 and a target coordinate value in accordance with the key input data is calculated. The controller 1, 2 or 3 and robot mechanism section $R_1$, $R_2$ or $R_3$ constitute a position control system wherein output values of pulse encoders PE are fedback via a counter 107, and the difference between a previous target coordinate value calculated by the microprocessor (A) 104 that is in terms of an encoder converted value and the fedback value is processed by a D/A connecter 106 into analog conversion outputs which drive actuators M. Each of the robots $R_1$, $R_2$ and $R_3$ has six degrees of freedom and there are provided six actuators M, six tacho-generators TG and six encoders PE.

FIG. 11 illustrates, in plan view, details of the teaching box 11, 12 or 13. The teaching box has a teaching work basic function operation panel which is manipulated for ordinary manual movement of a robot and storage of position data in the memory.

With reference to FIG. 12, posture information of a robot is a Cartesian coordinate value which is represented by six data in terms of mm unit and degree unit corresponding to coordinates X, Y and Z of a finger position P of the robot in XYZ coordinates and torsion angles $\alpha$, $\beta$ and $\gamma$ of the finger, where:

$\alpha$: angle made by a finger coordinate axis $X_H$ with respect to XY plane, $\beta$: angle made by a finger coordinate axis $Y_H$ with respect to XY plane, and $\gamma$: absolute rotation angle of a finger shaft (#6).

When a teaching program (stored in a ROM (23)) for the microprocessor (A) 104 is started, key input commands from the teaching box are interpreted following initialization of each data. To this end, keys on a teaching basic operation panel 119 of the teaching box 11, 12 or 13 which are being depressed are addressed periodically by a microprocessor (B) 112 through a key board display I/F 113 in response to a signal from a clock generator 114, addressed code data is sent to the microprocessor (A) 104 through bus line 118, ACIA 116, level changer 115, serial I/F 108 and bus line 105 in response to a data transfer requesting signal from the controller 1, 2 or 3, and the microprocessor (A) 104 analyzes the code data to determine what processing is instructed by the code data, so that the code data is transferred to a corresponding process routine and the program jumps to the process routine.

Involved in this procedure are a teaching processing (120a) for fetching the position coordinate value of robot into a memory 122, a mode change processing (120e, 120f) for selecting either an articulatory mode wherein individual shafts are independently moved during manual movement of the robot or an orthogonal mode wherein fingers are moved along the Cartesian coordinates, a hand lock and release processing (120c, 120d), and a processing wherein the microprocessor (B) 112 turns on LEDs (light emitting diodes) 121a to 121f located above depressed keys 120a to 120f through the PIO 117 so as to indicate that the processing keys 120a to 120f are depressed. These processings, however, will not be detailed herein.

An arm operation processing (120g to 120r) is adapted for calculating target values in accordance with operation modes determined by the mode change processing. The target values are determined in terms of orthogonal coordinates (A) and stored in the RAM 122. The determined target values correspond to a gradually increasing displacement within a range not exceeding a maximum displacement before initial depression of the key for the target coordinates is released, and a gradually decreasing displacement toward zero displacement after the key is released, these target values being added to or subtracted from coordinates (A) determined in one preceding cycle in accordance with the direction of movement to obtain current target coordinates. The current target coordinates are converted into corresponding encoder values for the respective robot shafts. Actual current values are obtained by reading outputs of the pulse encoders PE through the counter 107. Thus, the difference between the corresponding encoder value and the actual current value is applied, in the form of a current command pulse number, to the respective shafts through the D/A connecter 106, thereby applying speed instructions to the servodriver and then driving the robot.

In this manner, position data in each operation element for each robot $R_1$, $R_2$ or $R_3$ stored in the RAM 122 is read out through a communication interface 124 and then stored in the robot control data file 23. Alternatively, position data may be stored in post processor 27, 28 or 29, only position data number may be divided and edited, and position data corresponding to the position data number may be inputted by the post processor 27, 28 or 29.

Returning to FIG. 2, a robot control data dividing processor 24 featuring the present invention divides robot control data for each finger tool and for each assembling parts and stores the same in an operation element file 25. On the other hand, a work allotment processor 34 fetches work field situation data through a sensor or data input terminal unit 33 to determine the work allotment correspondingly, and instructs a robot control data editing processor 26 of the work allotment. The robot control data editing processor 26 featuring the present invention combines and edits the operation element for each robot in accordance with the work allotment instruction. The edited operation element is processed by the post processors 27 to 29 respectively associated with the robots in view of data formats specified thereto, thus preparing robot control data 30 to 32 for the respective robots.

Figure 3:
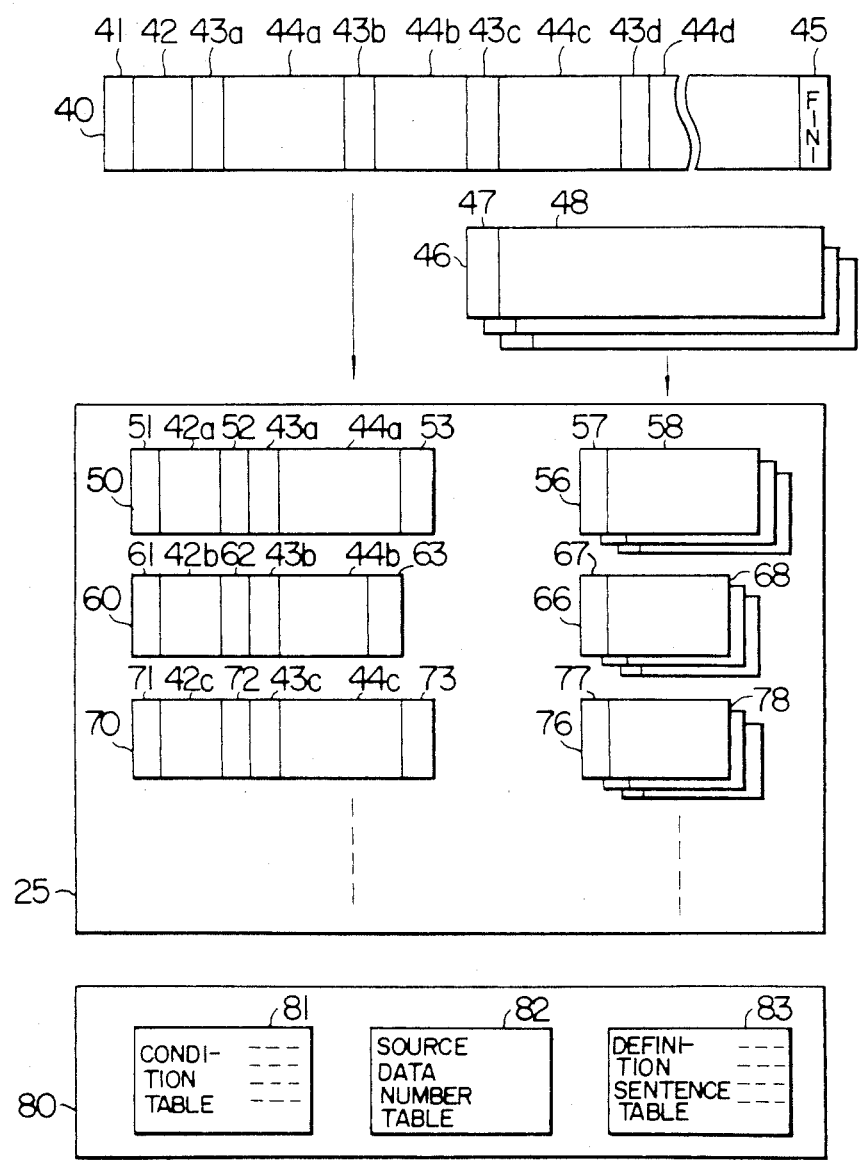
FIG. 3 illustrates data formats useful in explaining the operation of a robot control data dividing processor used in the apparatus of FIG. 2.

The robot control data dividing processor 24 performs a processing as shown in FIG. 3. An operation sequence data 40 corresponding to a product and representing an operation sequence of a robot necessary for assembling the product includes an operation sequence data number 41 corresponding to the product, a definition statement (representative of a hand and a finger tool used) 42, finger tool designating data 43a, 43b, 43c, 43d - - - for designating a plurality of finger tools generally used for assembling the single product, operation data 44a, 44b, 44c, 44d - - - indicative of operations by the designated finger tools and condition therefor, the finger tool designating data and the operation data constituting alternate sets of data, and a code FINI 45 indicative of the end of data. A product corresponding position data 46 representative of positions of the robots $R_1$, $R_2$ and $R_3$ at which the operations are performed includes a position number data number 47 and position data 48 which are related to position names in the operation sentence. As described above, since the robots $R_1$, $R_2$ and $R_3$ cannot be positioned to an identical position even if an identical position instruction is applied to the robots $R_1$, $R_2$ and $R_3$, the position data 46 is obtained by operating and teaching the robots $R_1$, $R_2$ and $R_3$.

The robot control data dividing processor 24 divides the product corresponding data 40 and 46 into one operation element data within a range of data necessary for assembling one type of parts by the use of a single finger tool, and stores, as the operation element file 25, the operation element data in a memory 24a such as, for example, a magnetic disc or a magnetic drum. Illustrated in the lower left of FIG. 3 are operation sequence element data 50, 60 and 70. Each of the operation sequence element data 50, 60 and 70 includes an operation sequence element number, a definition sentence, a start condition data, a finger tool designating data, an operation data and an end condition data. Each of the robots $R_1$, $R_2$, $R_3$ is provided with the position data 56, 66 and 76 and the position element data 56, 66 and 76 have position element numbers 57, 67 and 77 and position data 58, 68 and 78, respectively. A memory region 80 as shown in FIG. 3 has a condition table 81, a source data number table 82, and a definition sentence table 83. This memory region may be part of the memory for storage of the operation element file 25 or may be part of the memory 24a built in the robot control data dividing processor 24.

Figure 4:
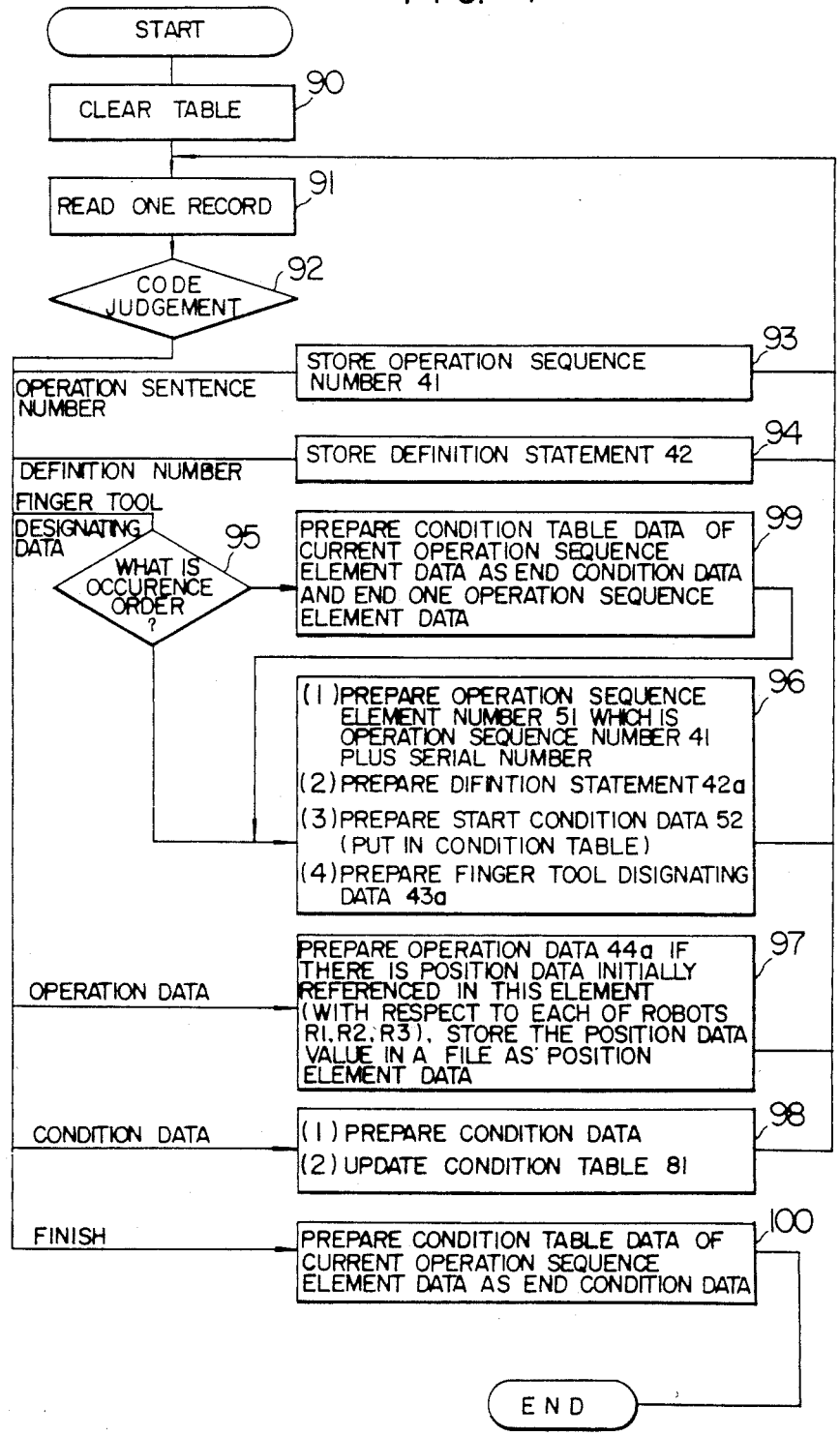
FIG. 4 is a flow chart for explaining the operation of the robot control data dividing processor.

Referring now to FIG. 4, the manner of dividing all the control data 40 and 46 to prepare the operation element data 50, 60 70 - - - and position element data 56, 66, 76 - - - will be described.

When reading out all the data 41 to 45 in the operation sequence data 40, all the table 81 and 83 in the memory region 80 are first cleared in step 90. The operation sequence data 40 is read out one by one record and it is judged in steps 91 and 92 as to what data the one record is. In accordance with the results of the judgment, the one record data proceeds to either step 93, 94, 95, 96, 97, 98 or 100.

Firstly, the operation sequence data number 41, specifically, "D0001", for example, is read out and stored in the table 82 of the storage region 80 in step 93. Subsequently, the definition sentence 42 is stored in the table 83 of the storage region 80 in step 94.

Next, the finger tool designating data 43a is examined in step 95 for its inputting frequency. At present, the inputted finger tool designating data 43a of the first occurrence is sent to step 96, in which the following processings are performed. Firstly, the operation sequence data number 41 i.e., "D0001" stored in the table 82 is combined with a serial number to prepare the operation sequence element number 51, for example, "D0001-1". This operation sequence element number 51 is stored in the first stage of the operation element file 25. Secondly, the definition sentence 42 stored in the table 83 is stored, as definition statement 42a, in the file 25 to follow the operation element number 51. Thirdly, the condition data in the table 81 is stored, as start condition data 52, in the file 25 to follow the definition statement 42a. Fourthly, the finger tool designating data 43a now inputted is stored in the file 25 to follow the start condition data 52.

Subsequently, the operation data 44a including, as described previously, a plurality of records consisting of a pure operation data for the robot hand and a condition data for designating conditions for work is judged one by one record in step 92 and sent to step 97 or 98. The robot hand operation data is prepared in step 97 and stored in the file 25 to follow the finger tool designating data 43a. This operation data is referenced to the position data, and if referenced initially in the position data corresponding operation element with respect to each of the robots $R_1$, $R_2$, $R_3$, it is made correspondent to the operation element for storage in the file 25. On the other hand, the condition data is prepared in step 98 and stored in the file 25 to follow the operation data 44a. This condition data updates the contents of the condition table 81 of the storage region 80. More specifically, the operation data 44a in the operation sequence data 40 is transferred, as it is, to the operation sequence element data 50 to follow the finger tool designating data 43a, and each time the condition data in the operation data 44a is extracted, the contents of the table 81 are updated.

Next, the finger tool designating data 43b is inputted to step 95 via steps 91 and 92. This data 43b of the second occurrence is then sent to step 99, in which the following processings are performed. The data of the condition table 81 updated in the previous processing is formed into the end condition data in the first operation sequence element and added, as end condition data 53, to the end of the operation sequence element data 50. In this manner, preparation of the first operation sequence element data 50 has been completed.

The completion of preparation of the first operation sequence element data 50 implies start of preparing the second operation sequence element data 60, and the step 96 is executed following step 99. In the step 96, like the preparation of the first operation sequence element data 50, the operation sequence element number 61 ("D0001-2"), definition statement 42b, start condition data 62 and finger tool designating data 43b are prepared and stored in the second stage of the operation element file 25 in the order of data 61, 42b, 63 and 43b. Of course, the start condition data 62 standing for the data of the table 81 and the finger tool designating data 43b of the second occurrence are now put in storage. Following the preparation of the second operation sequence element data 60 (61, 42b, 62, 43b and 63), the third operation sequence element data 70 (71, 42c, 72, 43c and 73) and so on are prepared in a similar manner.

Finally, the FINISH code 45 is read and the end of the last stage operation sequence element data is added with the data of the condition table 81 as end condition data, thus completing the division of the operation sequence data 40. In the above division processing, the position data 46 is divided into 56, 66 and 76 which correspond to position values used for the respective operation elements, and these divisional data are prepared.

The robot control data is edited in accordance with a work allotment instruction from the work allotment processor 34. The work allotment is performed by making reference to conditions of the work precedence relation between the operation elements on the basis of information from the sensor or data input terminal unit 33, namely, work loading condition of each of the robots $R_1$, $R_2$ and $R_3$, presence or absence of failure of machine and finger tool mounting condition. In controlling a plurality of robots each having a plurality of finger tools, the most efficient work allotment to the individual robots may be searched for by, for example, a wellknown branch boundary method (B.B.M) or dynamic planning (D.P) which treats problems on assembling line balance.

Figure 1:
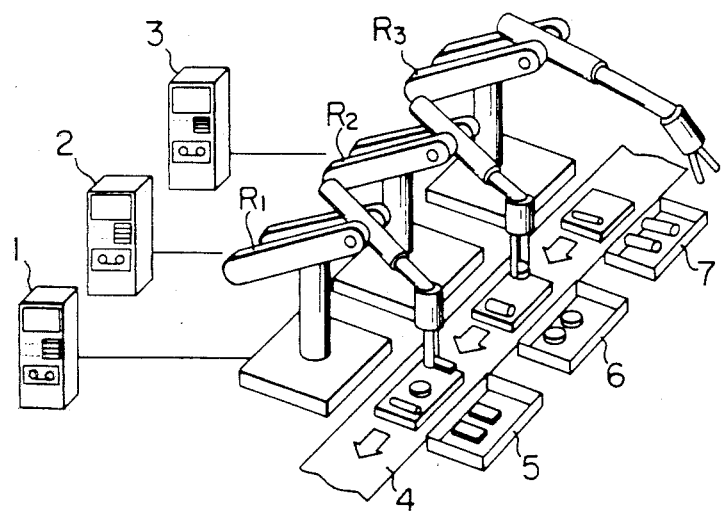
FIG. 1 is a perspective view of an assembling line utilizing robots.
Figure 5:
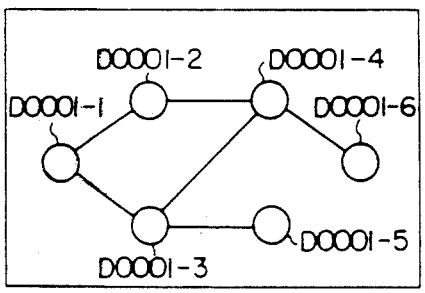
FIG. 5 illustrates one example of operational precedence relation.

For example, it is now assumed that one product assembling is composed of six operation elements, the work capability of the individual robots is as shown in Table 1, and the work precedence relation between the operation elements is as shown in FIG. 5.

TABLE 1

| Operation element number | Finger tool number | $R_1$ | $R_2$ | $R_3$ | Work time (sec) |
|---|---|---|---|---|---|
| D0001-1 | T182 | o | o | x | 8 |
| D0001-2 | T114 | x | o | o | 4 |
| D0001-3 | T093 | o | x | x | 8 |
| D0001-4 | T080 | o | x | o | 4 |
| D0001-5 | T521 | x | o | o | 6 |
| D0001-6 | T201 | x | o | o | 6 |

In Table 1, the validity of the working operation elements "D0001-1" to "D0001-6" by the robots $R_1$, $R_2$ and $R_3$ is denoted by a mark "o" and invalidity is denoted by a mark "x". Validity or invalidity depends on specification of each robot $R_1$, $R_2$ or $R_3$ and which type of finger tool adapted for a specified operation element the robot $R_1$, $R_2$ or $R_3$ carries, T182, T114, - - - or T201. Itemized in the righthand-end column in Table 1 are work times for the operation element.

Work sequence among the operation elements "D0001-1" to "D0001-6" necessary for assembling one product is technically constrained to follow the work precedence relation as shown in FIG. 5. In a diagrammatic representation of FIG. 5, arrows imply the constrained work sequence according to which the operation element "D0001-4", for example, cannot start working before workings of the operation elements "D0001-2" and "D0001-3" have been completed. Such various types of information as depicted in Table 1 and FIG. 5 have previously been inputted to the work allotment processor 34 from the sensor or data input terminal unit 33 and the work allotment processor 34 performs the work allotment to the individual robots $R_1$ to $R_3$ on the basis of the wellknown search theory. It will readily be appreciated that if in this example the operation elements "D0001-1" and "D0001-2" are shared by the robot $R_2$, the operation elements "D0001-3" and "D0001-4" are shared by the robot $R_1$ and the operation elements "D0001-5" and "D0001-6" are shared by the robot $R_3$, each of the robots $R_1$, $R_2$ and $R_3$ will perform the most efficient work within a work time of 12 seconds. This work allotment is illustrated in FIG. 6A in which the robot symbols are described in circles.

Assuming that the robot $R_2$ becomes out of order, it is necessary to allot the work shared by the robot $R_3$ to the robots $R_1$ and $R_2$ and rearrange the work time for the robots $R_1$ and $R_3$. If marks "o" representative of valid capability owned by the robot $R_2$ in Table 1 are simply replaced by marks "x", the operation elements now invalid for the robot $R_2$ but valid for the robot $R_1$ or $R_3$ will automatically be determined and work allotment to the robots $R_1$ and $R_3$ will be as shown in Table 2.

TABLE 2

| Robot | Operation element number | Work time (sec) |
|---|---|---|
| $R_1$ | D0001-1, D0001-3 | 16 |
| $R_3$ | D0001-2, D0001-5, D0001-6 | 16 |

In this case, the work time for both the robots $R_1$ and $R_3$ is 16 seconds and the remaining operation element "D0001-4" may optionally be allotted to either the robot $R_1$ or the robot $R_3$. In determining the allotment of the operation element "D0001-4", the frequency of movements of the product through the robots and the direction of flow of the assembling line should be taken into consideration since these factors are dependent on the sequence of processings.

The operation element "D0001-4" is allotted to the robot $R_1$ in FIG. 6A and to the robot $R_3$ in FIG. 6C. As will be seen from FIGS. 6B and 6C, the allotment according to FIG. 6C is reduced in frequency of movements of the product through the robots and is more advantageous than the allotment according to FIG. 6B.

The robot control data is edited by the robot control data editing processor 24 in accordance with a work allotment instruction from the work allotment processor 34. The editing process is exemplified in FIG. 7 and the robot control data editing processor 26 performs this process in accordance with flow charts as shown in FIGS. 8 and 9.

Illustrated in the upper block are six operation sequence element data 50, 60, 70, 110, 120 and 130 and corresponding position element data 56, 66, 76, 116, 126 and 136 which are provided in each of the robots $R_1$, $R_2$, $R_3$, these data being obtained from the division processing as shown in FIG. 3. The operation element numbers correspond to those shown in Table 1. The editing processing will be exemplified on the assumption that the work allotment is pursuant to FIG. 6C in the event of failure of the robot $R_2$.

Operation sequence data for the robot $R_1$ is edited by the operation sequence element data 50 and 70, and operation sequence data for the robot $R_3$ is edited by the operation sequence element data 60, 110, 120 and 130. Similarly, position data for the robot $R_1$ is edited by making reference to the data 56 and 76, and position data for the robot $R_3$ is edited by making reference to the position data of the corresponding robot of the data 66, 116, 126 and 136.

Firstly, when, in the event of failure of the robot $R_2$, failure information is fed from the sensor or data input terminal unit 33 associated with the robot $R_2$ to the work allotment processor 34, this processor 34 performs the aforementioned work allotment and at the same time, transmits results of the allotment and an editing instruction to the robot control data editing processor 26. In step 160, the robot control data editing processor 26 reads the allotment results and editing instruction. In step 161, predetermined operation sequence element data (a work group 140 composed of data 50 and 70, and a work group 150 composed of data 60, 110, 120 and 130) is read out of the operation element file 25 shown in FIGS. 2 and 3 and arranged.

To describe the first work group 140, among the operation sequence element data 50 and 70 arranged in step 161, the start condition data 52 of the operation sequence element data 50 is compared with the end condition data of an operation sequence element data preceding by one element in step 162. In this example, since there is no data preceding the operation sequence element data 50, the start condition data 52 as it is is set as initial state.

Subsequently, the start condition data 72 of the operation sequence element data 70 is compared with the end condition data 53 of the operation sequence element data 50 which precedes by one element, and if there is a different data, this different data is inserted as condition change data 141 behind the start condition data 72. If many operation elements are present in one work group, a number of insertions of the condition change data are carried out sequentially.

Thereafter, in step 163, the start condition data 52 and 72, end condition data 53 and 73, source data number 71 of the second and following occurrence, and definition statement 42c are removed. In step 164, the end of the data is added with a FINISH code 142, thereby completing an operation sequence data 140 of the first work group.

For preparation of the second work group, a similar processing is performed wherein condition change data 151 and 152 are newly inserted and a FINISH code 153 is added to complete an operation sequence data 150 of the second work group.

For preparation of the position element data, on the other hand, the allotment results and editing instruction are read in step 170 and in step 171, the position data of the corresponding robot is read out in the order of read-in operation element numbers and arranged in this order. Thereafter, if some of the position data arranged have the same name, these data are removed.

In this manner, the position data 146 of the first work group and the position data 156 of the second work group can be prepared.

FIG. 13 illustrates a program example of the operation sequence in a robot language and three portions of D0001-4 (204), D0001-5 (205), and D0001-6 (206) divided by the system of this invention. Now, as considering the operation speed (SPEED) of the robot and the on-off (AUX-ON, AUX-OFF) of the synchronized output to the peripheral equipments of an apparatus No. 120 as a data condition, the start condition data of each element work becomes 214, 215, and 216, and the end condition data becomes 224, 225, and 226.

Then, some works are assigned to the robot $R_3$ in order to directly perform D0001-6 after D0001-4.

If D0001-4 and D0001-6 are combined without considering the start condition and the end condition, as shown in FIG. 14, there occurs the malfunction that the first operation MOVE POINT 61 which should originally operate at SPEED 10 moves at SPEED 20 which is the speed condition of D0001-4.

According to this invention, the robot control data processing apparatus can operate at SPEED 20 under the right condition only by comparing the end condition 224 of D0001-4 with the start condition 216 of D0001-6 and by newly inserting the instruction languages SPEED 10 and AUX-ON 120 (230), and the apparatus No. 120 can be started in the on-state of the synchronized output, and consequently the operation sequence of the right work group can be obtained immediately.

If the original positions of the robots $R_1$, $R_2$ and $R_3$ (at which the counter 107 is reset) and a product reference point of the product to be assembled are measured by a suitable instrument and these data are inputted through an input terminal unit 35 and stored, it is possible to change the position data so as to be adapted for the robot. If the amounts of operations of the robots $R_1$, $R_2$ and $R_3$ are different, correction coefficients determined by teaching several points within the operating area of the robot may be inputted through the input terminal unit 35 and stored, and the position data may be multiplied by the stored correction coefficients, thus making it possible to provide the position data in a similar form to the source program 21 without teaching at all robots every individual product.

The operation sequence data 40 may be divided into the operation elements in various manners. For example, one method is available wherein each of the operation sequence element data is constituted by only the finger tool designating data 43a, 43b, 43c - - - and operation data 44a, 44b, 44c - - - , the source data number and the definition statement are formed into one operation element, the FINI statement deemed as one operation element is stored in the operation element file, and the start condition data 52, 62, 72, - - - and end condition data 53, 63, 73, - - - corresponding to the respective operation elements are related to the operation elements and stored in storage regions. According to this method, editing can be performed by repeating a procedure in which the operation element composed of the source data number and definition statement is read out, the end condition of this operation element is compared with the start condition of the initially designated operation element for insertion of the condition change data, and thereafter the corresponding operation element data is supplied, thereby simplifying the division and editing work.

As has been described, according to the present invention, the robot control data can be prepared freely by combining a plurality of operation elements which are prepared by dividing all the control data necessary for assembling a single product, so that the rate of operation of the robots and production efficiency can be improved by making work allotment in units of an operation element so as to follow transitional changes of the work field situation.

We claim:

1. A robot control data processing apparatus comprising:
robot control data dividing processor means for dividing robot control data, which is provided for monitoring and controlling robots, into a plurality of operation elements and for storing the robot control data in units each comprising an operation element; and
robot control data editing processor means coupled to said robot control data dividing processor means for selectively combining and editing one or more of the plurality of said operation elements for each robot to be controlled.

2. A robot control data processing apparatus according to claim 1 further comprising work allotment processor means for determining a work allotment for each of the robots in accordance with the work loading condition of the plurality of robots, hand or finger tool mounting conditions and the work precedence relation of the robots between the operation elements and for controlling said robot control data editing processor means so that said combining and editing of operation elements is effected on the basis of said work allotments.

3. A robot control data processing apparatus according to claim 1 wherein said robot control data dividing processor means comprises storage means for storing the data comprising each operation element, said storage means having storage regions for storing at least start condition data for starting the operation of each operation element, end condition data issued at the time of ending the operation, and operation data.

4. A robot control data processing apparatus according to claim 3, further including means for updating said end condition data of each operation element by analyzing condition data included in the operation data for each operation element when said robot control data dividing processor means divides the robot control data.

5. A robot control data processing apparatus according to claim 4 wherein for combining and editing a predetermined one of the operation element data prepared by division of the robot control data by said robot control data dividing processor means, said robot control data editing processor means comprises means for comparing the start condition data of a predetermined operation data with the end condition data of a preceeding edited operation element data and inserts condition data in said predetermined operation data based on the difference resulting from said comparison.

* * * * *